United States Patent
Ramm-Schmidt et al.

(10) Patent No.: US 6,638,398 B1
(45) Date of Patent: Oct. 28, 2003

(54) METHODS FOR THE EVAPORATION OF AN AQUEOUS SOLUTION CONTAINING AMMONIA

(75) Inventors: Leif Ramm-Schmidt, Kirkkonummi (FI); Matti Laajaniemi, Nurmijärvi (FI); Peter Koistinen, Espoo (FI)

(73) Assignee: Hadwaco Ltd Oy (FI)

( * ) Notice: Subject to any disclaimer, the term of this patent is extended or adjusted under 35 U.S.C. 154(b) by 0 days.

(21) Appl. No.: 10/049,342
(22) PCT Filed: Aug. 11, 2000
(86) PCT No.: PCT/FI00/00685
§ 371 (c)(1), (2), (4) Date: May 21, 2002
(87) PCT Pub. No.: WO01/12548
PCT Pub. Date: Feb. 22, 2001

(30) Foreign Application Priority Data

Aug. 11, 1999 (FI) .................................................. 991703

(51) Int. Cl.[7] .............................. B01D 3/34; C01C 1/10
(52) U.S. Cl. .................... 203/34; 159/47.3; 159/49; 159/DIG. 15; 159/DIG. 20; 203/10; 203/26; 203/35; 203/86; 203/89; 203/90; 203/36; 423/352
(58) Field of Search ................................ 203/34–37, 90, 203/25, 26, 100, 10, DIG. 8, 89, 86; 159/47.3, 48.1, DIG. 20, 49, DIG. 15; 202/202; 423/352

(56) References Cited

U.S. PATENT DOCUMENTS

| | | | | |
|---|---|---|---|---|
| 4,323,430 A | * | 4/1982 | Glassman et al. | 203/7 |
| 4,594,131 A | * | 6/1986 | Maier | 203/26 |
| 4,655,929 A | | 4/1987 | Tanaka et al. | 210/664 |
| 5,236,557 A | * | 8/1993 | Muller et al. | 203/10 |

FOREIGN PATENT DOCUMENTS

| | | |
|---|---|---|
| CN | 1120519 | 4/1996 |
| DE | 3341935 | 5/1995 |
| EP | 0029536 | 6/1981 |
| EP | 0377476 | 7/1990 |

* cited by examiner

Primary Examiner—Virginia Manoharan
(74) Attorney, Agent, or Firm—Lahive & Cockfield, LLP

(57) ABSTRACT

A method including evaporating aqueous solutions containing ammonia, adding an acid to the evaporated vapor flow to form an ammonium salt, and condensing the vapor flow to form a liquid containing the salt. By this method the ammonia formed into a salt is not present as an inert gas layer which would impede condensation on the condenser surfaces.

9 Claims, 2 Drawing Sheets

METHODS FOR THE EVAPORATION OF AN AQUEOUS SOLUTION CONTAINING AMMONIA

This application is a U.S. national phase application of PCT application No. PCT/FI00/00685 filed on Aug. 11, 2000 and published under PCT Article 21(2) in English, which claims priority of application Serial No. 19991703 filed in Finland on Aug. 11, 1999.

BACKGROUND OF THE INVENTION

This invention relates to a method for evaporating aqueous solutions containing ammonia, the method comprising condensation of the evaporated vapor into a liquid.

In the evaporating treatment of effluents or similar aqueous solutions containing ammonia ($NH_3$), ammonia is evaporated along with the aqueous vapor if the pH is about 6 or more. Condensation of the formed evaporated vapor containing ammonia is troublesome, because the poorly water-soluble ammonia forms an inert gas layer on the condenser surfaces, where it hampers heat transfer. The negative impact of ammonia on the condenser operation starts at an ammonia concentration as low as approx. 300–500 ppm. For this reason, complete condensation of vapor containing ammonia requires a markedly greater temperature difference in the condenser than does condensation of pure aqueous vapor.

The poor condensability of ammonia involves a problem in evaporators whose operation is based essentially on the utilization of heat released from condensed vapor in the process. Especially in Mechanical Vapor Recompression (MVR) evaporators, in which the available temperature difference is low, or in multistage evaporating plants, which use low value waste heat, the high ammonia concentration of the vapor may stop the evaporator operation entirely.

The aqueous solutions rich in ammonia and treated by evaporation that cause problems comprise i.a. effluents from the chemical industry, the slaughtering industry and agriculture, leachate water from landfills and sludge digestion press waters from urban waste water purification plants.

Ammonia can be removed from the aqueous solution before evaporation by means of a combined stripper-scrubber, where ammonia stripping may be performed with the use of inert gas. During the stripping, the solution should have a minimum pH of 9–10, and to achieve this, lye addition to the solution is required in most cases. The treatment of contaminated effluents involves the additional problem of the stripper being clogged by solid matters precipitated onto the packing elements, and used with hot water, the stripper causes heat losses. In all these cases, the stripper and the scrubber entail extra device and operational costs and result in a complex process.

Another known method for eliminating the ammonia problem in evaporation is to drop the pH of the solution by means of acid to a value below 5, at which ammonia is neutralized in salt form. In this form, ammonia does not evaporate, but remains in the concentrate during evaporation. However, this process has the drawbacks of high acid consumption, especially when the solution has a high buffer capacity, and also of carbon dioxide being possibly released from the carbonates, requiring a gas stripper before evaporation in order to be removed. In addition, the use of hydrochloric acid in particular increases the corrosivity of the solution, whereas the use of sulfuric acid may result in detrimental gypsum deposits if the solution contains calcium.

Ammonia can also be removed from the solution by means of a biological process, in which the nitrogen of the ammonia is first oxidized into nitrate and then reduced into nitrogen gas. Nevertheless, such a process is typically susceptible to circumstances, such as water quality and any nutrients contained in the water, and thus it has poor operational reliability.

BRIEF SUMMARY OF THE INVENTION

The object of the invention is to provide a new solution to the problem of evaporating aqueous solutions containing ammonia, in which the prior art in conveniences described above are avoided. The method of the invention is characterized by adding acid to the evaporated vapor emitted from the solution in order to bind the ammonia contained in the vapor into ammonium salt.

With the acid addition of the invention, ammonia neutralizes into a water-soluble salt form, which will no longer form an inert gas layer on the condensation surfaces, which would prevent heat transfer at the condensation stage. By adding acid to the evaporated vapor in an amount stoichiometrically equivalent to the ammonia neutralization reaction, the problem caused by inert gas can be totally overcome.

Hydrochloric acid, sulfuric acid and phosphoric acid, for instance, are suitable acids for ammonia neutralization. Nitric acid and some organic acids are also potential acids in this conjunction. Acid is preferably added to the evaporated vapor by spraying or atomizing.

The method of the invention is applicable to many types of evaporating plants, which may comprise one single step or many steps. The invention is especially advantageous in multi-stage evaporators operating at gradually decreasing temperatures and in MVR evaporators equipped with a compressor, such as film distillers, in which evaporated vapor compressed to higher pressure is recycled to the evaporator as heating vapor. In these plants, acid addition preferably takes place by atomizing at a suitable location of the vapor duct before the condenser, either before or after the compressor in MVR evaporators. The large heat transfer surfaces of the condenser provide a contact surface that ensures complete reaction between acid and ammonia.

The ammonium salt produced in the types of evaporators mentioned above ends in the condensate, from where it can be removed if necessary for instance by reverse osmosis, ion exchange, re-evaporation or oxidation either with breakpoint chlorination or ozone. These processes have reliable operation, because the condensate contains no other impurities besides ammonium salt. A condensate containing ammonium salt can also be utilized as such as a fertilizer or an industrial raw material for instance.

The invention can also be implemented with the ammonium salt produced in ammonia neutralization being recovered without reaching the condensate formed. from vapor. This is performed by conducting the evaporated vapor to a scrubber, which is supplied with acid and where the formed ammonium salt is separated e.g. with a droplet separator from the vapor flow before the vapor is condensed. If the scrubber is connected to an MVR evaporator, it is preferably placed apart from the evaporator, either on the suction side or the pressure side of the compressor. Most preferred is the use of a Venturi scrubber, which causes negligible pressure loss in the vapor flow. The ammonium salt solution separated by the scrubber may have a concentration of about 10–30%, at which it is usable as a fertilizer or an industrial raw material.

In a further embodiment of the invention, the pH of the aqueous solution to be evaporated is raised with an alkaline addition so that the ammonia is released and passes to the evaporated vapor during evaporation. In other words, the invention allows also such aqueous solutions with a low pH to be treated whose evaporation would not release ammonium normally, i.e. without this alkaline addition. Since, in accordance with the invention, the ammonia release is under control, the process provides an advantageous means for recovering ammonium from the solution while preventing the ammonium from remaining in the concentrate, where it may be detrimental. If, for instance, such a concentrate were led to the waste bed of a landfill, the ammonia would affect the internal bioactivity of the landfill.

BRIEF DESCRIPTION OF THE DRAWINGS

The invention is explained in greater detail below with reference to the accompanying drawings, in which.

DETAILED DESCRIPTION OF THE INVENTION

Figure 1:
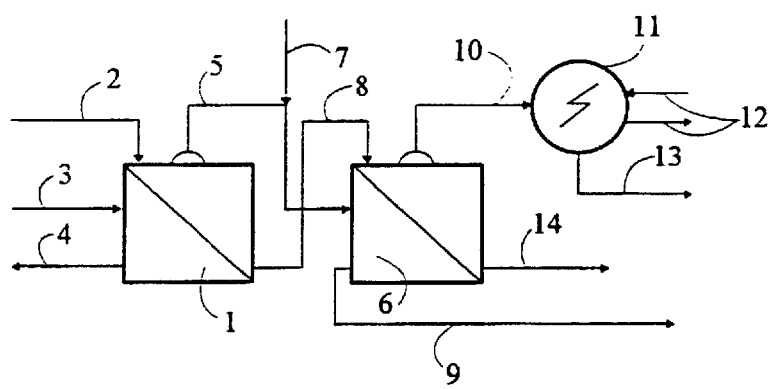
FIG. 1 shows a two-stage evaporator, where acid is added to the vapor duct between the stages.

As an example of multi-stage evaporation to which the present invention is applied, FIG. 1 shows a two-stage evaporator, in which an ammonia containing liquor intended to be evaporated is introduced in a first heat exchanger 1 through duct 2. Primary vapor is fed as a heating medium through duct 3, forming a primary condensate, which is discharged through duct 4. The vapor formed during evaporation is taken through duct 5 to a second heat exchanger 6 to form heating vapor in the second evaporating step. Besides aqueous vapor, this evaporated vapor contains gasified ammonia. Concentrated acid, such as hydrochloric acid or sulfuric acid, is introduced through vapor duct 5 in order to bind ammonia into ammonium salt when these acids are used as ammonium chloride or sulfate. The evaporation residue from the first heat exchanger 1 is transferred over duct 8 to heat exchanger 6 for evaporation with the vapor derived from duct 5, from where the formed condensate containing dissolved ammonium salt is removed to duct 9. The vapor from the second evaporation step passes through duct 10 to condenser 11, where cooling water circulation 12 condenses it into a condensate, which is discharged to duct 13. The concentrate remaining after the second evaporation step is discharged to duct 14.

Figure 2:
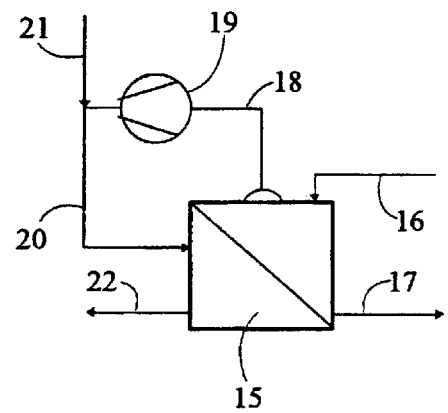
FIG. 2 shows an MVR evaporator, where acid is introduced in the vapor duct after the compressor.

The single-stage MVR evaporator 15 shown in FIG. 2 may be a film distiller comprising e.g. parallel bag-like heat transfer elements made of plastic film. The evaporator is supplied with the ammonia containing liquor to be evaporated through duct 16, and the concentrate remaining after evaporation is discharged to duct 17. The vapor formed during evaporation is taken over duct 18 to compressor 19, which compresses the vapor to higher pressure and temperature. The compressed vapor returns over duct 20 to form heating vapor in the evaporator, and to this vapor flow, acid is added from duct 21 in order to bind the ammonia accompanying the vapor into ammonium salt. The vapor is condensed in the evaporator to a condensate, which is removed over duct 22 and contains the formed ammonium salt in dissolved state.

The apparatus of FIG. 2 could be varied such that acid supply over duct 21 takes place to vapor duct 18 before compressor 19. The end result of the process would be the same as above, i.e. the formed ammonium salt ends in the condensate 22 removed from evaporator 15.

Figure 3:
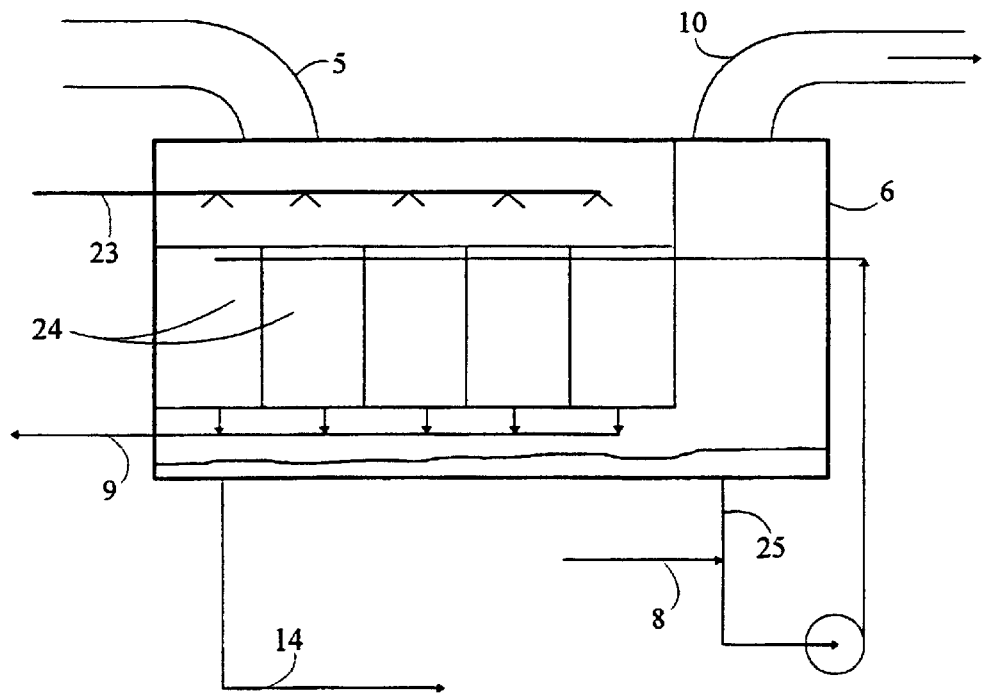
FIG. 3 shows an evaporator, where acid supply is provided above the parallel heat-transfer elements.

FIG. 3 shows an embodiment of the invention, where acid supply to the ammonia containing evaporated vapor takes place in the heat exchanger above the parallel heat exchange elements. This solution is applicable to multi-stage evaporators, such as for instance the second heat exchanger 6 in the two-stage evaporator of FIG. 1, and thus FIG. 3 uses the same reference numerals as FIG. 1. The acid feed duct inserted in heat exchanger 6 is marked with reference numeral 23 and the parallel heat exchange elements with reference numeral 24. The figure shows that concentrate to be evaporated can be recycled in the heat exchanger, the concentrate 8 from the first evaporating step being fed to recycling line 25.

The acid feed arrangement of FIG. 3 is similarly applicable to the MVR evaporator of FIG. 2. Acid introduction into the vapor compressed by the compressor would take place on the condensate side of the evaporator, to the feed pipes of the parallel heat transfer elements, or to a common vapor chamber immediately above the elements.

Figure 4:
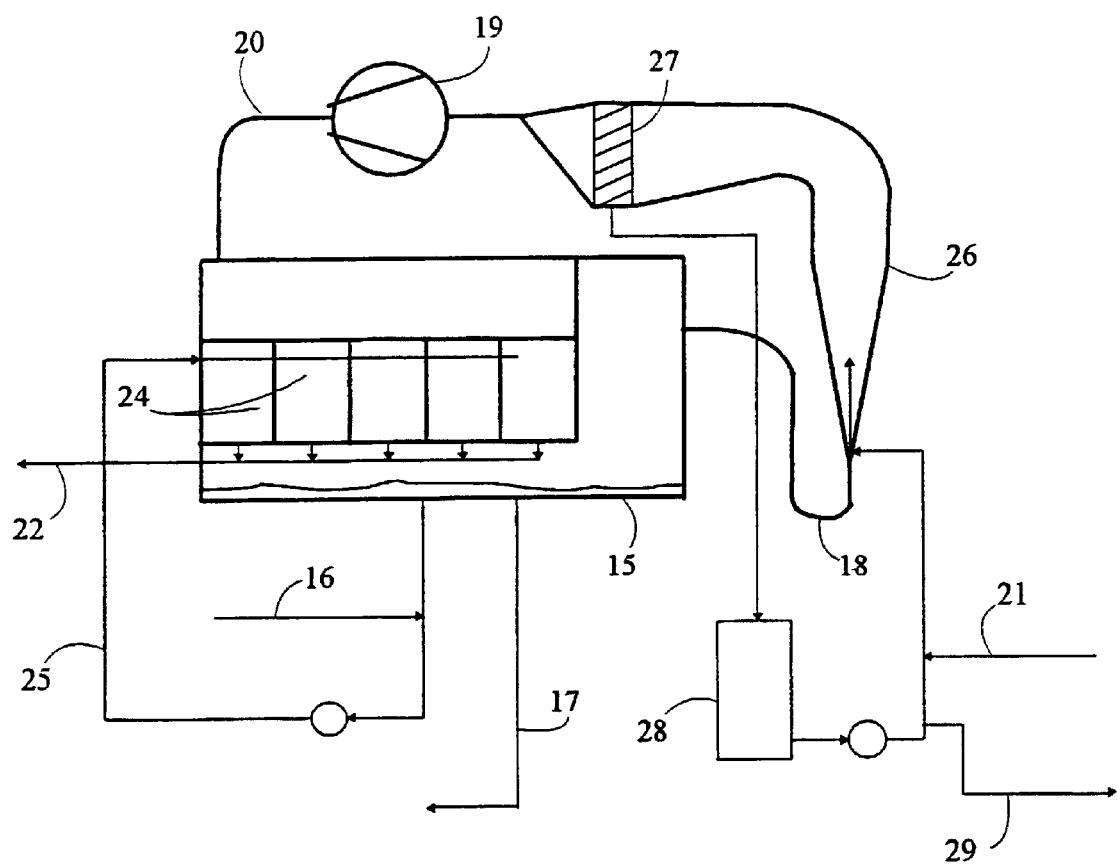
FIG. 4 shows an MVR evaporator, where acid addition to the vapor takes place in a Venturi scrubber placed before the compressor.

FIG. 4, which shows an MVR evaporator equipped with a Venturi scrubber, uses the same reference numerals as FIG. 2 when applicable. The ammonia containing liquor to be evaporated is introduced through duct 16 over recycling line 25 to the heat exchange elements 24 of the evaporator, and the formed condensate is removed to duct 17. The evaporated vapor passes through duct 18 to the Venturi scrubber 26, into which acid introduced over duct 21 is simultaneously atomized. The acid mist which binds the ammonia accompanying the vapor is separated from the vapor flow with a droplet separator 27 located at the upper end of the scrubber 26. The separated ammonium salt solution, which may occur in a 10–30% concentration, is collected in container 28 and removed over duct 29. In the figure, the solution can also be recycled along with the fed acid to the scrubber. The pure aqueous vapor passing through the droplet separator 27 of the scrubber continues to the compressor 19 and over duct 20 to form heating vapor in the evaporator, from where the condensate is discharged through duct 22. Unlike the processes of FIGS. 1 and 2, the ammonium salt is consequently obtained as a separate concentrated solution while the condensate condensed from the vapor is pure water.

The single-stage scrubber of FIG. 4 can be replaced with two-stage or multi-stage scrubbers, which allow separation of acid and ammonium salt with higher precision and accordingly higher condensate purity.

EXAMPLE

Aqueous solutions containing ammonia were evaporated in an evaporator operating on the principle of the MVR evaporator illustrated in FIG. 2 and equipped with concentrate recycling. The heat exchange surface of the heat transfer elements made of plastic film was approx. 100 m². The solution to be evaporated was introduced in the circulating solution. Concentrated 97% sulfuric acid, which was diluted to an approx. 5.5–7% concentration with the recycled condensation water, was introduced in the evaporated vapor on the pressure side of a fan acting as a compressor in order to neutralize ammonia and to prevent superheating. The condensate containing ammonium salt was removed from the evaporator with a condensate pump and the noncondensable gases were removed with a vacuum pump.

The operating temperature of the evaporator was 60° C. when measured on the evaporated vapor before the compressor, and accordingly, the operating pressure was about 200 mbar. The pressure difference between the evaporation side and the condensation side was 22 mbar and the corresponding temperature difference was 2.2° C. The solution to be evaporated was fed into the evaporator with total condensation of the water. The recycling rate of the solution during evaporation was 30 m³/h, concentrated sulfuric acid was introduced at a rate of about 5–6 kg/h, and aqueous condensate was recycled at a rate of 1.5 l/min in order to dilute the sulfuric acid. With the aid of sulfuric acid addition, the pH of the condensate was continually maintained below 4.

The evaporation was monitored by measuring the discharged condensate flow, which indicated the evaporator capacity, and the $NH_4$ content of the condensate. At the outset of the test, the feed had a zero ammonia content, and the amount of ammonia in the solution was subsequently increased gradually. This appears as an increase in the $NH_4$ content of the condensate. The amount of ammonia in the noncondensable gas was not measured. The results are shown in the following table.

TABLE

| $NH_4$ concentration of the condensate (mg/l) | Amount of condensate (m³/d) |
| --- | --- |
| 0 | 17.1 |
| 566 | 16.7 |
| 2,249 | 16.3 |
| 2,262 | 16.4 |
| 2,822 | 16.6 |

The results indicate that the capacity drop of the evaporator caused by the ammonia in the solution was low, of the order of 2–5%. As the sulfuric acid addition to the evaporated vapor was interrupted at the end of the test, with the ammonia concentration of the feed being about 4,000 ppm, this immediately resulted in a drop of the evaporator capacity to zero.

In addition, comparative tests conducted with the same evaporator confirmed that, without acid addition, the evaporator capacity begins to drop rapidly already at an ammonium concentration of 300 ppm of the condensate, and at an ammonia concentration of 1,000 ppm, the evaporation stops altogether.

It is obvious to those skilled in the art that the applications of the invention are not restricted to the examples described above, but may vary within the scope of the following claims.

What is claimed is:

1. A method comprising evaporating an aqueous solution containing ammonia, adding an acid to the evaporated vapor flow, and condensing the formed evaporated vapor into a liquid, the acid added to the vapor flow binding the ammonia contained in the vapor to a water-soluble ammonium salt, which ends up in the condensate as obtained.

2. A method as defined in claim 1, wherein the acid is added to the evaporated vapor flow in an amount equivalent stoichiometrically to that required to bind the amount of ammonia present in the evaporated vapor flow into said ammonium salt.

3. A method as defined in claim 1, wherein the acid used is hydrochloric acid, sulfuric acid or phosphoric acid.

4. A method as defined in claim 1, wherein the adding of the acid to the evaporated vapor is performed by spraying or atomizing.

5. A method as defined in claim 1, wherein the evaporating of the solution and the condensing of the evaporated vapor take place in at least one heat exchanger.

6. A method as defined in claim 5, wherein the evaporated vapor is compressed to higher pressure in a compressor and is returned as heating vapor to the at least one heat exchanger acting as an evaporator, the acid being added to the vapor flow either before or after the compressor.

7. A method as defined in claim 6, wherein the evaporator is a film evaporator comprising heat transfer bags made of plastic film.

8. A method as defined in claim 1, wherein the aqueous solution containing ammonia to be evaporated consists of effluents from agriculture or chemical industry, leachate water from a landfill or press water from sludge digestion.

9. A method as defined in claim 1, wherein the pH of the aqueous solution to be evaporated is raised with an alkaline addition in order to release the ammonia from its salts and to pass the ammonia to the evaporated vapor during evaporation.

* * * * *